United States Patent [19]

Walker et al.

[11] Patent Number: 5,091,060

[45] Date of Patent: Feb. 25, 1992

[54] FRACTIONAL DISTILLATION COLUMN AND METHOD FOR ITS USE

[75] Inventors: James D. Walker; Stone P. Washer, both of Bartlesville, Okla.

[73] Assignee: Phillips Petroleum Company, Bartlesville, Okla.

[21] Appl. No.: 580,899

[22] Filed: Sep. 10, 1990

[51] Int. Cl.[5] .................................... B01D 3/26
[52] U.S. Cl. ............................ 203/99; 196/111; 202/158; 203/DIG. 9; 261/114.5
[58] Field of Search ............. 202/158, 154, 153, 155; 203/99, DIG. 9; 261/114.5, 114.4, 146; 196/111

[56] References Cited

U.S. PATENT DOCUMENTS

| | | | |
|---|---|---|---|
| 3,700,216 | 10/1972 | Uitti et al. ........................ 261/114.1 |
| 4,025,398 | 5/1977 | Haselden ........................... 202/158 |
| 4,105,723 | 8/1978 | Mix ................................. 261/114.1 |
| 4,265,736 | 5/1981 | Thayer ............................. 202/158 |
| 4,361,469 | 11/1982 | Trutna .............................. 203/99 |
| 4,496,430 | 1/1985 | Jenkins ............................ 202/158 |
| 4,869,851 | 9/1989 | Parker et al. ...................... 261/114.1 |
| 4,872,955 | 10/1989 | Parker et al. ...................... 202/158 |

Primary Examiner—Virginia Manoharan
Attorney, Agent, or Firm—William R. Sharp

[57] ABSTRACT

A fractional distillation column and method for its use are provided which employ n sets of trays, where n is an integer and $n \geq 2$. An equivalent number n of separate liquid streams are passed generally downwardly through the column so that each liquid stream flows onto and between individual trays of its corresponding set of trays.

8 Claims, 2 Drawing Sheets

FRACTIONAL DISTILLATION COLUMN AND METHOD FOR ITS USE

BACKGROUND OF THE INVENTION

This invention relates to a fractional distillation column and a method of using such a column which considerably increases the liquid load capacity of the column as compared to a conventional distillation column.

Fractional distillation is widely employed for the separation of liquid mixture components (i.e. hydrocarbons) of different boiling points. Such fractional distillation is normally carried out in a fractionation column in which a feed is separated into a liquid phase and a vapor phase. Liquid flows across trays and down the column by means of downcomers, while the vapor phase passes upwardly through the trays.

Any fractional distillation column can accommodate a volume of liquid only up to a certain liquid load capacity. Heretofore, if a need arose to handle larger liquid loads, the only option was to simply replace the column with a column of larger diameter. Construction of a new column is clearly very expensive and labor intensive. A simpler and less expensive alternative would be desirable.

SUMMARY OF THE INVENTION

It is, therefore, an object of the invention to provide a fractional distillation column and method for its use which can accommodate larger liquid loads than conventional columns of the same size.

The above object is realized by a fractional distillation column which comprises a hollow shell and a plurality of vertically spaced, generally horizontally disposed trays within the shell, wherein the plurality of trays comprises n sets of trays, where n is an integer and n≥2, which are capable of passing vapor therethrough and which are arranged and structured to direct n separate liquid streams generally downwardly through the column so that each liquid stream flows onto and between individual trays of its corresponding set of trays.

According to another aspect of the invention, there is provided a fractional distillation method which comprises: providing a column as described above; passing n separate liquid streams generally downwardly through the column so that each liquid stream flows onto and between individual trays of its corresponding set of trays; and passing vapor generally upwardly through the plurality of trays.

According to a preferred embodiment of the invention described further herein, there is provided two sets of trays such that individual trays of a first set alternate in vertical position with respect to individual trays of a second set. Accordingly, liquid which flows from one tray of the first set to another tray of the first set by means of, for example, a downcomer, bypasses a tray of the second set which is positioned between the trays of the first set.

By splitting the flow of liquid in the column into a plurality of liquid streams which individually flow over only a portion of the trays in the column, this accomplishes an increase in the liquid load capacity of the column. Therefore, the invention enables increasing the liquid load capacity of an existing column by retrofitting the column so as to reconstruct the trays therein. This is a much less expensive operation than replacing the entire column.

DETAILED DESCRIPTION OF THE INVENTION

A preferred embodiment of the invention will now be described. Such an embodiment is applicable to any liquid mixture for which separation of certain components therefrom is desired.

Figure 1:
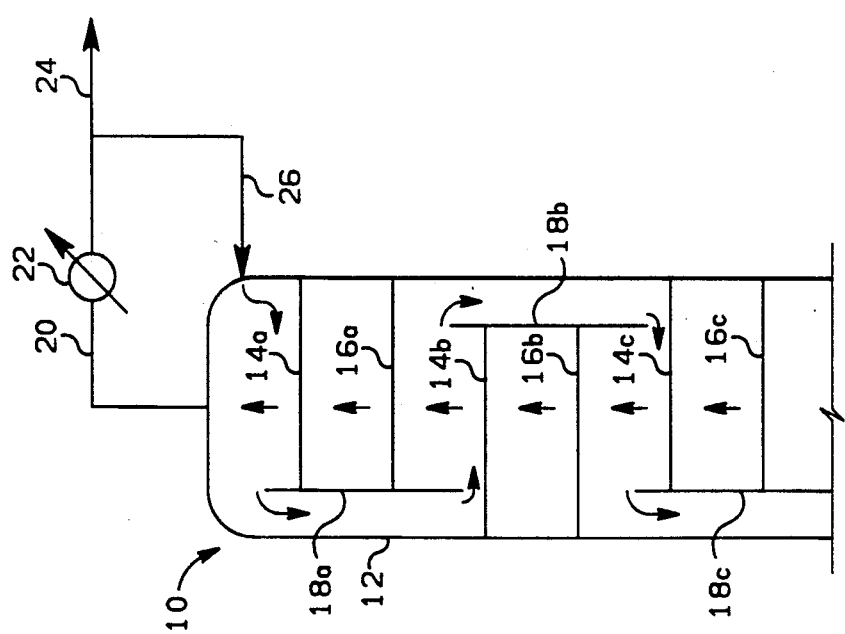
FIG. 1 is a schematic representation of a column in accordance with one embodiment of the invention, wherein a side view of the trays in the column is shown.

Referring now to FIG. 1, FIG. 1 is a schematic illustration which shows the flow of one liquid stream therein. Only the upper portion of column 10 is shown, thereby omitting features associated with the lower portion of the column such as a reboiler, associated conduits, etc.

Column 10 includes a generally vertically oriented shell 12 having a plurality of vertically spaced, generally horizontally disposed trays mounted therein. The plurality of trays comprises a first set of trays 14 which includes individual trays 14a, 14b and 14c. The plurality of trays further comprises a second set of trays which includes individual trays 16a, 16b and 16c. As shown, the trays are positioned within shell 12 so that individual trays of the first set 14 alternate in vertical position with respect to individual trays of the second set 16.

Column 10 further comprises a first set of downcomers which includes individual downcomers 18a, 18b and 18c which are associated with trays 14a, 14b and 14c, respectively, in a manner which will now be described. Downcomer 18a is connected to respective outer edges of trays 14a and 16a such that downcomer 18a vertically extends from its upper end positioned immediately above tray 14a to its lower end positioned below trays 14a and 16a but above tray 14b. Downcomer 18b vertically extends from its upper end, which is positioned above tray 14b and also above the vertical position of the lower end of downcomer 18a, to its lower end positioned below trays 14b and 16b but above tray 14c. Downcomer 18c is similarly oriented with respect to downcomer 18b and trays 14c and 16c.

With respect to the various flow paths which are indicated by arrows, liquid is introduced near the top of column 10 so as to flow onto and across tray 14a. A portion of such liquid, hereinafter referred to as the first liquid stream, flows over the upper end of downcomer 18a, along the side of downcomer 18a, and from the lower end of downcomer 18a onto tray 14b so as to bypass tray 16a. Similarly the first liquid stream flows across tray 14b, over the upper end of downcomer 18b, down the side of downcomer 18b and onto tray 14c so as to bypass tray 16b. The first liquid streams continues its flow across tray 14c, over the upper end of downcomer 18c, and down the side of downcomer 18c so as to bypass tray 16c. The first liquid stream continues its flow between trays of set 14 in a lower portion of column 10 not shown. Vapor flows within column 10 so as to flow generally upwardly through each of the trays as indicated by the upwardly pointing arrows. Vapor flows through the trays by means of passages therethrough which are not shown in FIG. 1, but which will be discussed further below. After flowing through the various trays so as to contact the liquid flowing across the trays, such vapor passes through the top of the column via conduit 20. The vapor is then condensed to liquid form by condenser 22, and a portion of such liquid is drawn off through line 24 as final product or for further processing. The remainder of the liquid from condenser 22 is passed through line 26 and back into column 10 as reflux. Such liquid flows downwardly through the column between the plurality of trays as discussed previously.

Figure 2:
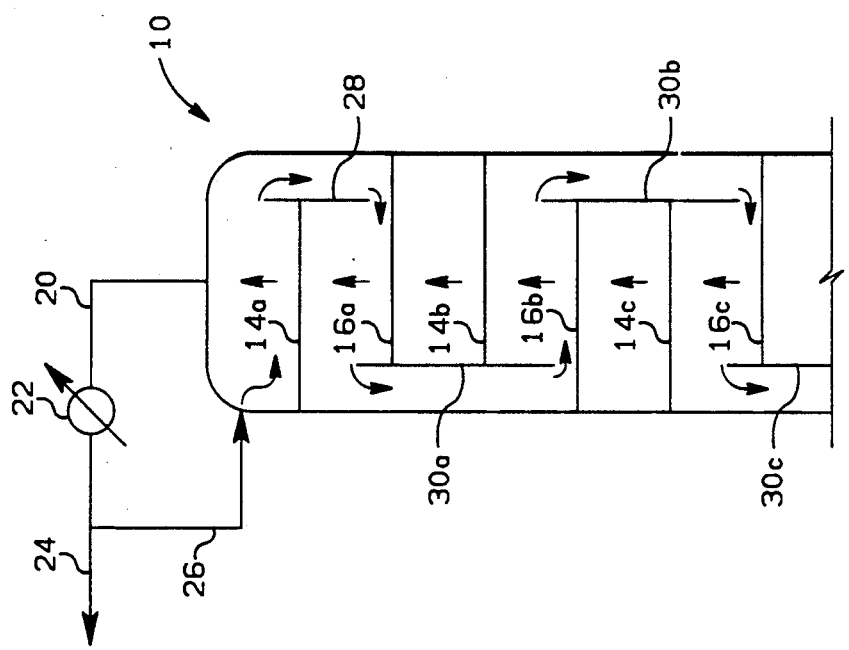
FIG. 2 illustrates a different side view of the trays shown in FIG. 1 as viewed from a position 90° offset from the perspective of FIG. 1.

Referring now to FIG. 2, another view of column 10 is shown which is rotated 90° with respect to the view of FIG. 1. The view of FIG. 2 shows a different set of downcomers and the flow of a second liquid stream associated therewith. Downcomer 28 is connected to an outer surface of tray 14a so as to extend from an upper end positioned above tray 14a to a lower end positioned below tray 14a but above tray 16a. Downcomer 28 is provided for guiding the second liquid stream to the uppermost tray 16a of the second set of trays 16 as will be discussed further below. A second set of downcomers 30 includes downcomers 30a, 30b and 30c. As shown, downcomer 30a is connected to outer surfaces of trays 16a and 14b so as to extend from an upper end, which is positioned above tray 16a and above the vertical position of the lower end of downcomer 28, to a lower end below trays 16a and 14b but above tray 16b. Downcomer 30b is similarly oriented with respect to downcomer 30a and trays 16b, 14c and 16c. Only the upper portion of downcomer 30c is shown as having an upper end immediately above tray 16c.

With respect to flow paths indicated in FIG. 2 by arrows, liquid as introduced into column 10 flows across tray 14a, as also shown in FIG. 1. However, a second portion of such liquid is split off as a second liquid stream which flows over the upper end of downcomer 28 and downwardly along downcomer 28 onto tray 16a. The second liquid stream accordingly flows across tray 16a and over the upper end of downcomer 30a, down the side of downcomer 30a and onto tray 16b so as to bypass tray 14b. The second liquid stream then flows across tray 16b, over the upper end of downcomer 30b, down the side of downcomer 30b and onto tray 16c so as to bypass tray 14c. The second liquid stream flows across tray 16c, over the upper end of downcomer 30c and continues its flow downwardly through the column. As in FIG. 1, upper vapor flow through the various trays in FIG. 2 is indicated by upwardly pointing arrows.

Figure 3:
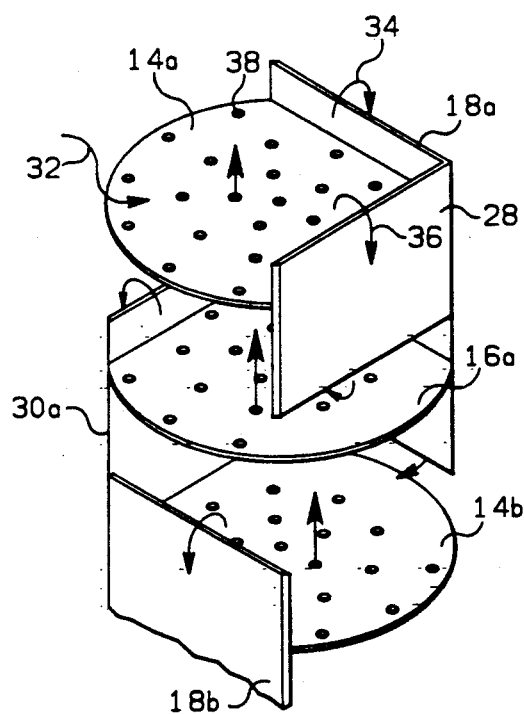
FIG. 3 is an isometric view of the above-mentioned top three trays and their associated downcomers.

Referring now to FIG. 3, there is shown an isometric view of trays 14a, 16a and 14b and their associated downcomers which more clearly shows the relative orientations of such downcomers. FIG. 3 also more clearly shows the manner in which tray 14a, in conjunction with downcomers 18a and 28 splits the liquid into the first and second liquid streams. Liquid is introduced onto tray 14a, as indicated at 32, most preferably and as shown at a position diametrically opposed from the line along which downcomer 18a joins downcomer 28. Liquid accordingly flows across tray 14a and is split into approximately equal portions as first liquid stream 34 and second liquid stream 36. First liquid stream 34 flows from tray 14a to tray 14b so as to bypass tray 16a in the same manner as shown in FIG. 1. Second liquid stream 36 is shown as flowing from tray 14a to tray 16a, the uppermost tray of the second set of trays 16, across tray 16a, and downwardly along downcomer 30a so to bypass tray 14b in the same manner as shown in FIG. 2.

Also shown in FIG. 3 are schematic representations of passages in the trays, such as indicated at 38, through which vapor flows so as to intimately contact liquid on the upper surfaces of the respective trays. Such passages can be suitably small openings in the trays, bubble caps, or any other suitable means which permits vapor to flow upwardly through the trays. Such upward flow of vapor is indicated in FIG. 3 by the upwardly pointing arrows.

Figure 4:
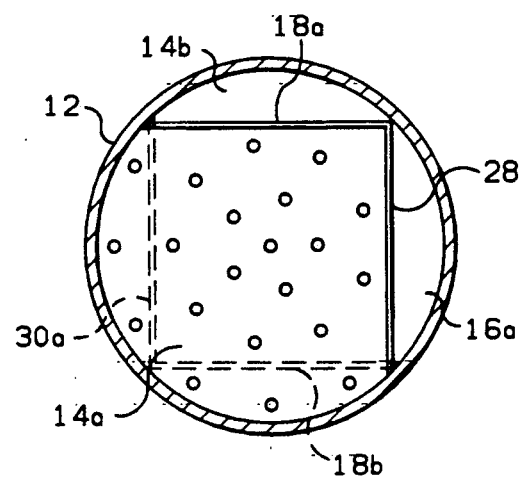
FIG. 4 is a cross-sectional view of the column as viewed along a line immediately above the top tray.

Referring now to FIG. 4, there is shown a cross-sectional view of the column as viewed along a line immediately above tray 14a. FIG. 4 shows a cross section of shell 12, the entire upper surface of tray 14a, a portion of the upper surface of tray 14b, and a portion of the upper surface of tray 16a. FIG. 4 further shows the upper ends of downcomers 18a and 28, and in broken lines the upper ends of downcomers 18b and 30a. Vapor passages are preferably not provided in the visible portions of trays 14b and 16a which lie directly below the spaces defined between the interior surface of shell 12 and downcomers 18a and 28, respectively. It can be seen from FIG. 4 that downcomers 18a and 18b, of the first set of downcomers 18, are diametrically opposed from and generally parallel to one another. Downcomer 30a of the second set of downcomers 30 is generally parallel to downcomer 28 and generally perpendicular to downcomers 18a and 18b. Similarly, each of the downcomers of a particular set of downcomers are parallel to one another but generally perpendicular to each of the downcomers of the other set of downcomers.

A calculated example will now be described for the purpose of further illustrating the invention and its advantages. This example should not be construed to limit the invention in any manner.

Two computer simulations were made to model a stripping column (a column to remove a small amount of light gases from a stream also containing heavier components). The first simulation, hereinafter called the control simulation, was in acccordance with a conventional column with ten sieve trays, wherein all of the liquid therein flows across each tray. The second simulation, hereinafter called the inventive simulation, was in accordance with an inventive column of the general design shown in FIGS. 1–4, also having ten sieve trays. Each simulation employed a column simulation program, available from Oleson & Associates of Laguna Beach, Calif., for computing various process conditions and compositions of vapor and liquid, and a tray design program, available from Fractionation Research Institute of Bartlesville, Okla., for computing structural dimensions of the column and trays based on data generated by the column simulation program.

Input data into the column simulation program included the flow rate of the feed and the composition of the feed, which in each simulation was assumed to be as follows in terms of mole fractions: isobutane–0.05; neopentane–0.10; isopentane–0.30; pentane (normal)–0.40; and hexane (normal)–0.15. The column simulation program was further set up for removal of 50% of the isobutane and 15% of the neopentane from the feed.

Set forth in Table I are feed rates and various other process conditions as computed by the column simulation program for each simulation.

TABLE I

| Item | Control | Invention | % Change |
|---|---|---|---|
| Feed (lb. mole/hr.) | 4469 | 5715 | 21.8 |
| Overhead Product (lb. mole/hr.) | 292 | 369 | 21.0 |
| Reflux (lb. mole/hr.) | 3812 | 5104 | 25.3 |
| Condenser Duty (Btu/mole of feed) | −8181 | −8549 | 25.2 |
| Reboiler Duty (Btu/mole of feed) | 5562 | 5935 | 26.7 |

Set forth in Table II are mole fractions of the different components of the overhead product for each simulation, also as computed by the column simulation program.

TABLE II

| Component | Control | Invention |
|---|---|---|
| Isobutane | 0.384 | 0.387 |
| Neopenane | 0.230 | 0.234 |
| Isopentane | 0.208 | 0.205 |
| Pentane | 0.168 | 0.164 |
| Hexane | 0.010 | 0.010 |

Set forth in Table III are important structural dimensions of the column in each simulation as computed by the tray design program. Several ranges are indicated in Table III, having an upper limit and a lower limit, where different values were obtained for the various trays. The term "downcomer area" as used in Table III means the cross-sectional area of the space defined between the interior surface of the shell and a downcomer. The term "hole" as used in Table III means the holes in the trays which receive vapor upwardly therethrough. "Hole Diameter" is simply the diameter of each individual hole and "Hole Area" is the total cross-sectional area of the holes corresponding to a particular tray expressed in terms of the percentage of the surface area of the tray. Note that the column diameter is the same in each simulation so as to enable a valid comparison between the two simulations. The feed flow rate indicated in Table I for the inventive simulation was selected since it resulted in the same column diameter computation as in the control simulation.

TABLE III

| Item | Control | Invention |
|---|---|---|
| Column Diameter (inches) | 106 | 106 |
| Tray Spacing (inches) | 24 | 24 |
| Downcomer Area (sq. feet) | 13.59-14.74 | 9.02-9.64 |
| Hole Diameter (inches) | 0.5 | 0.5 |
| Hole Area (%) | 7-10 | 10 |

The data in the above Tables shows that a column modified in accordance with the invention has a nearly 22% increase (Table I) in liquid load capacity (feed rate) as compared to the conventional column of the control simulation. This result is achieved in conjunction with a slightly improved separation as indicated in Table II (slightly larger fractions of the light components isobutane and neopenane and slightly smaller fractions of the heavy components isopentane and pentane) and about a 25% increase in the condenser duty and reboiler duty as indicated in Table I.

The results of this example therefore show that a conventional column can be modified (i.e. retrofitted) in accordance with the invention to achieve a considerable increase in liquid feed capacity at the expense of an associated increase in energy input into the reboiler and condenser.

Obviously many modifications and variations of the present invention are possible in light of the above teachings. For example, the invention could be applied to more than two separate liquid streams, in which case there would be an equal number of corresponding sets of trays. It is therefore to be understood that within the scope of the appended claims the invention may be practiced otherwise than as specifically described.

That which is claimed is:

1. A fractional distillation column comprising:
   a hollow shell;
   a plurality of vertically spaced, generally horizontally disposed trays within said shell, said plurality of trays comprising n sets of trays, where n is an integer and $n \geq 2$, which will pass vapor therethrough and which are arranged and structured to direct n separate liquid streams generally downwardly through the column, and wherein said plurality of trays includes an uppermost, top tray which is structured such that liquid thereon is split into said n liquid streams;
   a plurality of downcomers, wherein each tray has a downcomer, having an upper end and a lower end, associated therewith and wherein for any one tray of one set of trays said downcomer associated with said one tray of said one set generally vertically extends from its upper end positioned immediately above said one tray to its lower end positioned below said one tray and below at least one tray of at least one other set of trays but immediately above another tray of said one set, such that one liquid stream corresponding to said one set flows from said one tray of said one set, over the upper end of said downcomer so as to flow along said downcomer, and from the lower end of said downcomer to said another tray of said one set so as to bypass said at least one tray of said at least one other set;
   whereby each liquid stream flows onto and between individual trays of its corresponding set of trays so as to bypass the other trays of said plurality of trays.

2. A column as recited in claim 1 wherein n=2 such that said plurality of trays comprises said one set and only one other set of trays which respectively correspond to two liquid streams.

3. A column as recited in claim 2 wherein said plurality of trays are positioned in said shell so that individual trays of said one set of trays alternate in vertical position with respect to individual trays of said other set of trays.

4. A column as recited in claim 3 wherein said downcomer associated with said one tray of said one set is oriented so as to be generally perpendicular to said downcomer associated with said one tray of said other set.

5. A column as recited in claim 4 wherein said downcomer associated with said one tray of said one set is diametrically opposed from and generally parallel to said downcomer associated with said another tray of said one set.

6. A fractional distillation method comprising:
(a) providing a column having a plurality of vertically spaced, generally horizontally disposed trays which comprise n sets of trays, where n is an integer and $n \geq 2$, said column further having a plurality of downcomers, wherein each tray has a downcomer, having an upper end and a lower end, associated therewith and wherein for any one tray of one set of trays said downcomer associated with said one tray of said one set generally vertically extends from its upper end positioned immediately above said one tray to its lower end positioned below said one tray and below at least one tray of at least one other set of trays but immediately above another tray of said one set;
(b) passing n separate liquid streams generally downwardly through the column so that one liquid stream corresponding to said one set flows from said one tray of said one set, over the upper end of said downcomer so as to flow along said downcomer, and from the lower end of said downcomer to said another tray of said one set so as to bypass said at least one tray of said at least one other set, whereby each liquid stream flows onto and between individual trays of its corresponding set of trays so as to bypass the other trays of said plurality of trays, and wherein said plurality of trays includes an uppermost, top tray from which liquid splits into said n separate streams; and
(c) passing vapor generally upwardly through said plurality of trays.

7. A method as recited in claim 6 wherein $n=2$ such that said plurality of trays comprises said one set and only one other set of trays which respectively correspond to two liquid streams.

8. A method as recited in claim 7 wherein said plurality of trays are positioned so that individual trays of said one set of trays alternate in vertical position with respect to individual trays of said other set of trays.

* * * * *